United States Patent [19]

Becker et al.

[11] Patent Number: 5,431,826
[45] Date of Patent: Jul. 11, 1995

[54] AUTOMATIC GREASE INTERCEPTOR WITH TEMPERATURE AND GREASE LEVEL MONITORING

[75] Inventors: Allen R. Becker; David L. Lawson; Brian N. Creager, all of Erie, Pa.

[73] Assignee: Zurn Industries, Inc., Erie, Pa.

[21] Appl. No.: 33,851

[22] Filed: Mar. 19, 1993

[51] Int. Cl.⁶ .............................................. B01D 17/12
[52] U.S. Cl. ...................... 210/742; 210/104; 210/149; 210/187; 210/521; 210/774
[58] Field of Search ............ 210/86, 88, 89, 104, 210/134, 149, 187, 519, 521, 532.1, 632, 742, 744, 774, 800, 94, 143

[56] References Cited

U.S. PATENT DOCUMENTS

| | | | |
|---|---|---|---|
| 1,396,889 | 11/1921 | Sepulchre | 210/539 |
| 2,003,140 | 5/1935 | Dehn | 210/532.1 |
| 2,140,582 | 12/1938 | Hirschstein | 210/532.1 |
| 2,284,737 | 6/1942 | Hirshstein | 210/539 |
| 2,638,177 | 5/1953 | Heindlhofer | 210/539 |
| 2,879,894 | 3/1959 | Nelson | 210/187 |
| 2,935,197 | 5/1960 | Marple | 210/109 |
| 2,982,414 | 5/1961 | Hirschstein | 210/149 |
| 2,985,305 | 5/1961 | Nock et al. | 210/83 |
| 3,144,408 | 8/1964 | Pascual | 210/322 |
| 3,253,711 | 5/1966 | Young | 210/83 |
| 3,481,469 | 12/1969 | Walker | 210/96 |
| 3,847,810 | 11/1974 | Tulumello | 210/96 |
| 3,847,814 | 11/1974 | Adachi | 210/237 |
| 4,051,024 | 9/1977 | Lowe et al. | 210/30 |
| 4,113,617 | 9/1978 | Bereskin et al. | 210/149 |
| 4,145,287 | 3/1979 | Walker et al. | 210/104 |
| 4,235,726 | 11/1980 | Shimko | 210/523 |
| 4,268,396 | 5/1981 | Lowe | 210/670 |
| 4,385,986 | 5/1983 | Jaisinghani et al. | 210/123 |
| 4,425,239 | 1/1984 | Jacocks et al. | 210/787 |
| 4,940,539 | 7/1990 | Weber | 210/149 |
| 4,983,284 | 1/1991 | Batten | 210/187 |
| 5,091,095 | 2/1992 | Fries et al. | 210/774 |

FOREIGN PATENT DOCUMENTS

| | | | |
|---|---|---|---|
| 1097227 | 3/1981 | Canada | 182/2.5 |
| 2928701 | 2/1981 | Germany | 210/104 |
| 1584095 | 2/1981 | United Kingdom | 210/513 |

OTHER PUBLICATIONS

Zurn Hydromechanics Handbook . . . 691, pp. IT3–IT6 and IT17, date unknown.

Primary Examiner—Joseph W. Drodge
Attorney, Agent, or Firm—Webb Ziesenheim Bruening Logsdon Orkin & Hanson

[57] ABSTRACT

An automatic grease interceptor for separating grease, fats and oils from wastewater is disclosed. The interceptor includes an interceptor chamber having an inlet, an outlet chamber with an outlet and a removable baffle positioned within the interceptor chamber. A grease removal device is attached to the interceptor chamber for removing accumulated grease from the interceptor chamber. A grease level sensor is positioned within the interceptor chamber at a first threshold level, wherein an indication of grease at the first threshold level by the first grease level sensor will activate the grease removal mechanism to thereby automatically remove grease from the interceptor chamber.

18 Claims, 5 Drawing Sheets

AUTOMATIC GREASE INTERCEPTOR WITH TEMPERATURE AND GREASE LEVEL MONITORING

BACKGROUND OF THE INVENTION

1. Field of the Invention

The present invention relates to grease recovery devices for separating grease, fats and oils from wastewater and, more specifically, to an automatic grease interceptor.

2. Prior Art

Grease interceptors are used in plumbing wastewater systems to permit free flow of drainage from sinks and similar equipment and to prevent grease accumulations from clogging connecting piping, sewer lines and wastewater treatment plants. The process of grease interception is simply the separating and retaining of globules of grease, fats and oils from wastewater as it passes through a grease interceptor.

Small molecules of grease unite together in wastewater, cling to and accumulate on the inside of pipelines clogging drainage lines from sinks, dishwashers and other sources of grease-laden wastewater. In food service and other commercial and industrial applications, wastewater is generated with high grease or animal fat content. As this wastewater is discharged through the wastewater disposal system, the grease accumulates on the interior walls of the wastewater pipe. As the grease coating grows, it obstructs the flow of wastewater in the sewage pipe.

To permit adequate flow, the obstruction must be removed by unearthing and working on the pipe. This is a costly and time-consuming procedure. Grease interceptors are utilized to intercept and remove the grease prior to entrance in the disposal system.

The most common method of grease extraction is the use of a vessel placed in line with a wastewater disposal pipe. This device usually uses gravity to separate grease from water. The operating principle behind a gravity separator is that grease has a lower specific gravity than water and therefore floats to the surface inside the intercepting vessel. In standard grease interceptors, once the grease interceptor has reached full capacity, the wastewater inlet must be closed, the lever removed and the grease ladled out manually. The lever can then be replaced and the process repeated. This manual removal procedure is somewhat time-consuming and inefficient.

Another method of grease extraction involves the use of enzymes to digest the grease prior to entry into the discharge system. The major difficulty with the enzyme solution is the sensitivity of the enzyme to the environment. The enzyme is only able to survive in a very narrow temperature and humidity band which are difficult to maintain within a dynamic situation such as a wastewater pipe. Furthermore, the recovered grease has a salvage value which is valuable to the user. The use of enzymes to digest the grease can minimize the potential recovery of salvaged grease.

Another known method of grease interception is to place a device inside the recovery vessel to automatically remove the grease. Generally, these systems will run the automatic grease remover for a fixed duration each day. This operation presents several problems. If the automatic grease remover is not run long enough each day, not all of the grease generated in that period will be removed, causing a continual buildup of grease and the need for an eventual manual cleaning. Alternatively, if the automatic grease remover is run for too long a period, it will begin to remove water from the recovery vessel, ruining the commercial value of the salvaged grease.

The object of the present invention is to provide an automatic, electronic grease recovery device which minimizes the need for user intervention. Another object of the present invention is to provide a device that maintains the purity of the salvaged grease and eliminates grease buildup within the intercepting device. A further object of the present invention is to overcome all of the aforementioned drawbacks of the prior art.

SUMMARY OF THE INVENTION

The present invention provides an automatic grease interceptor for separating grease, fats and oils from wastewater. The automatic interceptor of the present invention includes an interceptor chamber, an inlet opening connected to the interceptor chamber, an outlet chamber connected to the interceptor chamber and an outlet opening connected to the outlet chamber. A removable baffle is positioned within the interceptor chamber and is adapted to minimize turbulence from the liquid being introduced into the interceptor chamber. A grease removal device is coupled to the interceptor chamber and is adapted to remove accumulated grease from within the interceptor chamber. A first grease level sensor is positioned within the interceptor chamber at a first threshold level and is coupled to the grease removal device through a central controller. In operation, an indication of grease at the first threshold level by the first grease level sensor will activate the grease removal mechanism to remove grease from the interceptor chamber for a grease removal cycle.

A preferred embodiment of the present invention may additionally include a temperature sensor coupled to the interceptor chamber and to the central controller. A heater element may be positioned within the interceptor chamber and is additionally coupled to the central controller. In operation, an indication by the temperature sensor of a temperature within the interceptor chamber below a predetermined temperature threshold value during the grease removal cycle will activate the heater element until the temperature sensor indicates the temperature within the interceptor chamber is above the predetermined temperature threshold value.

Additionally, the preferred embodiment of the present invention may provide a first valve positioned within the inlet opening and coupled to the central controller. A second grease level sensor may be positioned within the interceptor chamber at a second threshold level and may be coupled to the central controller. In operation, an indication of grease at the second threshold level will close the first valve, thereby prohibiting further inflow of liquid into the interceptor chamber. Preferably, a visual and/or audible alarm is included to indicate the need for operator attention. The alarm will be activated when the first valve is closed due to a determination of grease within the interceptor chamber at or above the second threshold level.

The grease removal mechanism of the present invention may be a conduit extending between a grease reservoir and the interceptor chamber. A second valve is positioned within the conduit and coupled to the central controller, wherein the grease removal mechanism is operated by opening and closing the second valve. The grease reservoir is adapted to receive grease from the conduit. A grease reservoir capacity sensor may be attached to the grease reservoir and coupled to the central controller which is adapted to indicate when the grease reservoir is filled to a predetermined capacity.

These and other advantages of the present invention will become more apparent in the description of the preferred embodiment in connection with the attached figures wherein like reference numerals indicate like elements throughout.

BRIEF DESCRIPTION OF THE PREFERRED EMBODIMENT

Figure 1:
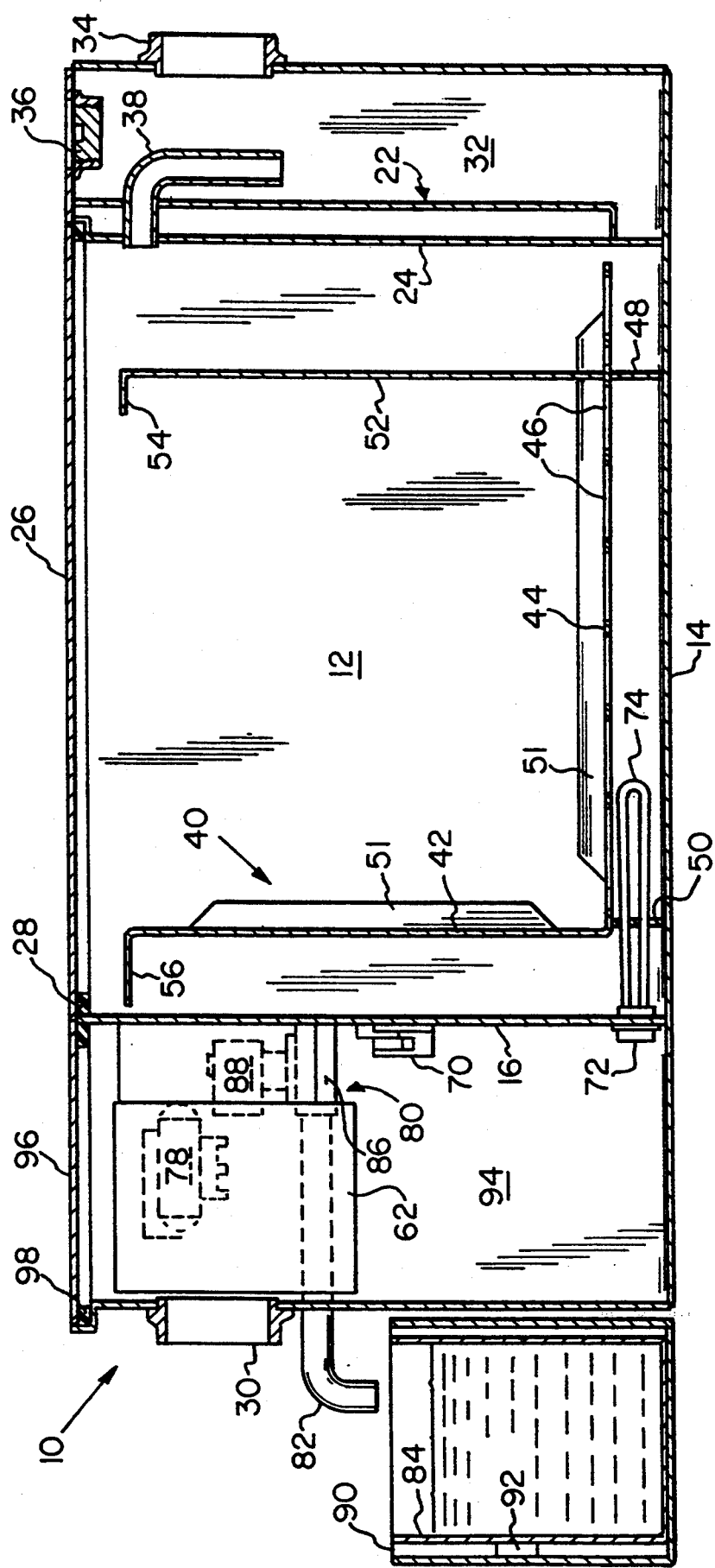
FIG. 1 is a cross-sectional side view of a grease interceptor according to the present invention.
Figure 2:
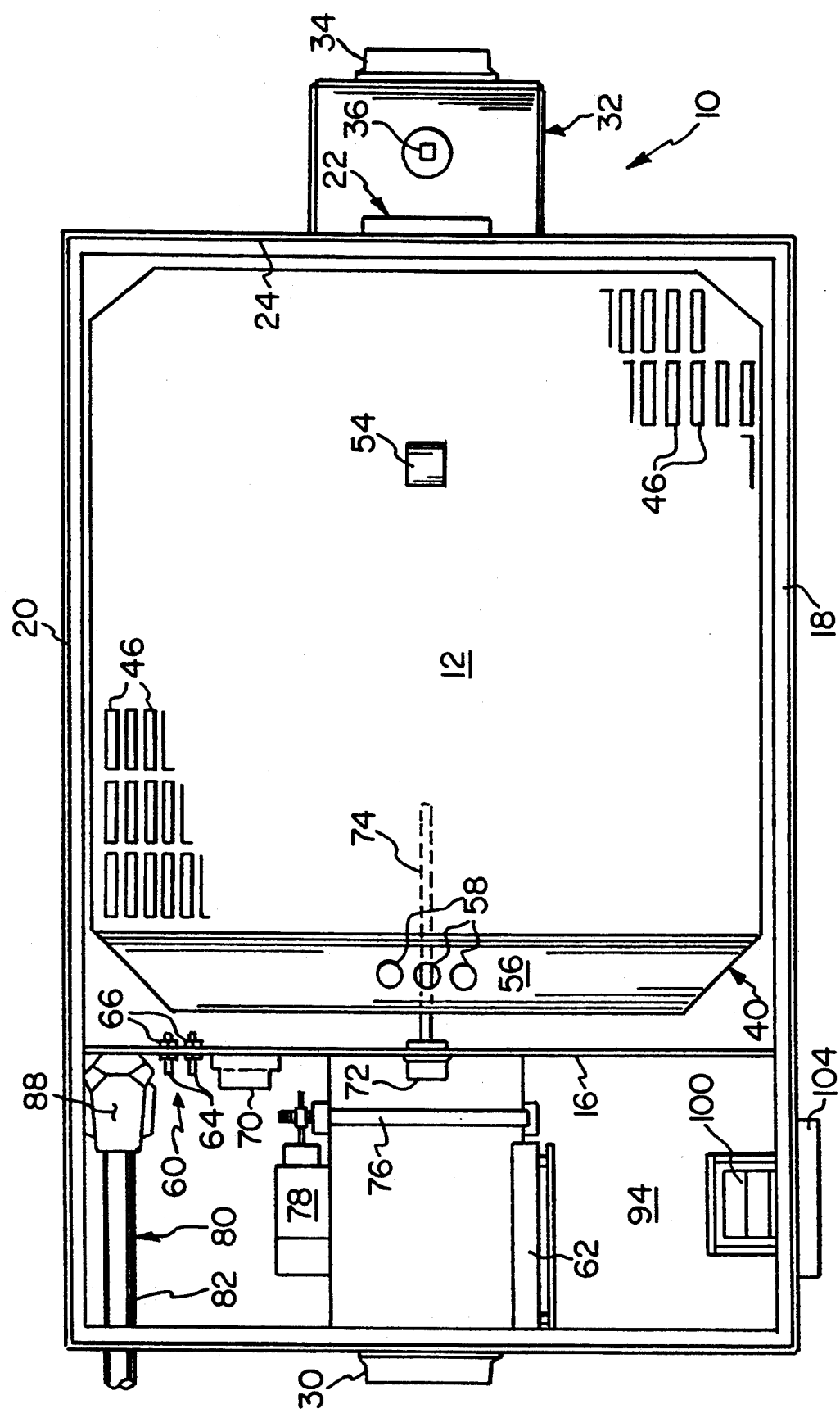
FIG. 2 is a top view of the grease interceptor of FIG. 1 with the grease reservoir removed for clarity.

FIG. 1 illustrates a grease interceptor 10 made according to the present invention. The grease interceptor 10 includes an interceptor chamber 12 which is bounded by base member 14, partition wall 16 extending between sidewalls 18 and 20 (shown in FIG. 2) and a double wall trap 22. A first wall 24 of the double wall trap 22 extends the entire way between the sidewalls 18 and 20. A removable interceptor chamber top 26 is attached by bolts (not shown) and, together with gasket 28, forms a gastight and watertight cover for the interceptor chamber 12.

The grease interceptor 10 is made of appropriate durable, corrosion-resistant materials in accordance with necessary codes. "Code Guide 302 and Glossary of Industry Terms" by the Plumbing and Drainage Institute indicates that "[g]rease interceptors shall be made of durable corrosion resistant materials. They shall have a double wall trap partition, and a gas and water tight cover securely fastened in place with easy means of manual or automatic removal of grease." The grease interceptor 10 is specifically designed to meet these applicable standards.

An inlet opening 30 connects with the interceptor chamber 12 through partition wall 16. The inlet opening 30 preferably has a no hub connection at an end thereof for easy attachment to the connecting piping. Alternatively, a threaded connection or another conventional connection may be provided.

An outlet chamber 32 connects with the interceptor chamber 12 at a lower portion of both the outlet chamber 32 and the interceptor chamber 12. The double wall trap 22 forms a barrier between the upper portion of the interceptor chamber 12 and the upper portion of the outlet chamber 32. The outlet chamber 32 includes an outlet opening 34 which exits the grease interceptor 10. The outlet opening 34 is positioned to be substantially the same height as the inlet opening 30 and is preferably a no hub connection. Alternatively, a threaded connection or another conventional connection may be provided at the outlet opening 34 to easily connect to the attached piping. Furthermore, the inlet opening 30 may be lowered to a height below the height of the outlet opening 34 to provide for greater flexibility in the installation of the grease interceptor 10.

A cleanout plug 36 is threadably connected to a top portion of the outlet chamber 32. The cleanout plug 36 provides access to the outlet opening 34 and the associated downstream piping. This access will allow for certain maintenance procedures to be accomplished without removal of the entire grease interceptor 10 such as, for example, inserting a plumber's snake through the outlet opening 34 and into the downstream piping.

An air relief bypass 38 extends from the interceptor chamber 12 through the double wall trap 22 into the outlet chamber 32. The air relief bypass 38 prevents the buildup of an air bubble within the interceptor chamber 12 which would reduce the efficiency of the interceptor chamber 12.

A removable baffle 40 is positioned within the interceptor chamber 12 and is adapted to minimize the turbulence from the liquid being introduced into the interceptor chamber 12. The baffle 40 includes a solid baffle plate 42 extending substantially the entire width of the interceptor chamber 12. A perforated bottom plate 44 is attached to a lower end of the baffle plate 42. Perforations 46 (partially shown in FIG. 2) extend substantially over the entire bottom plate 44. Some of the perforations 46 have been omitted from FIG. 2 for the sake of clarity. Perforations 46 allow the liquid to flow into the main portion of the interceptor chamber 12. A substantially solid interceptor plate 48 is attached to an underside of the bottom plate 44 and extends substantially the entire width of the interceptor chamber 12. The baffle 40 additionally includes short legs 50 attached to a bottom side of the bottom plate 44 at an opposed side of the bottom plate 44 from the interceptor plate 48. The short legs 50 do not extend the entire width of the interceptor chamber 12 and are intended to provide support for the baffle 40. Flanges 51 are provided on the sides of the baffle plate 42 and bottom plate 44 for structural support.

The baffle 40 additionally includes a narrow lift handle 52 attached to the bottom plate 44 with a grip portion 54 at an upper end of the lift handle 52. A grip plate 56, which is provided with a plurality of lift holes 58 (shown in FIG. 2), is attached to an upper end of the baffle plate 42. The lift handle 52, grip portion 54, grip plate 56 and lift holes 58 allow for easy removal of the baffle 40. To remove the baffle 40, the interceptor chamber top 26 must be removed and baffle 40 lifted directly out of the interceptor chamber 12.

Figure 3:
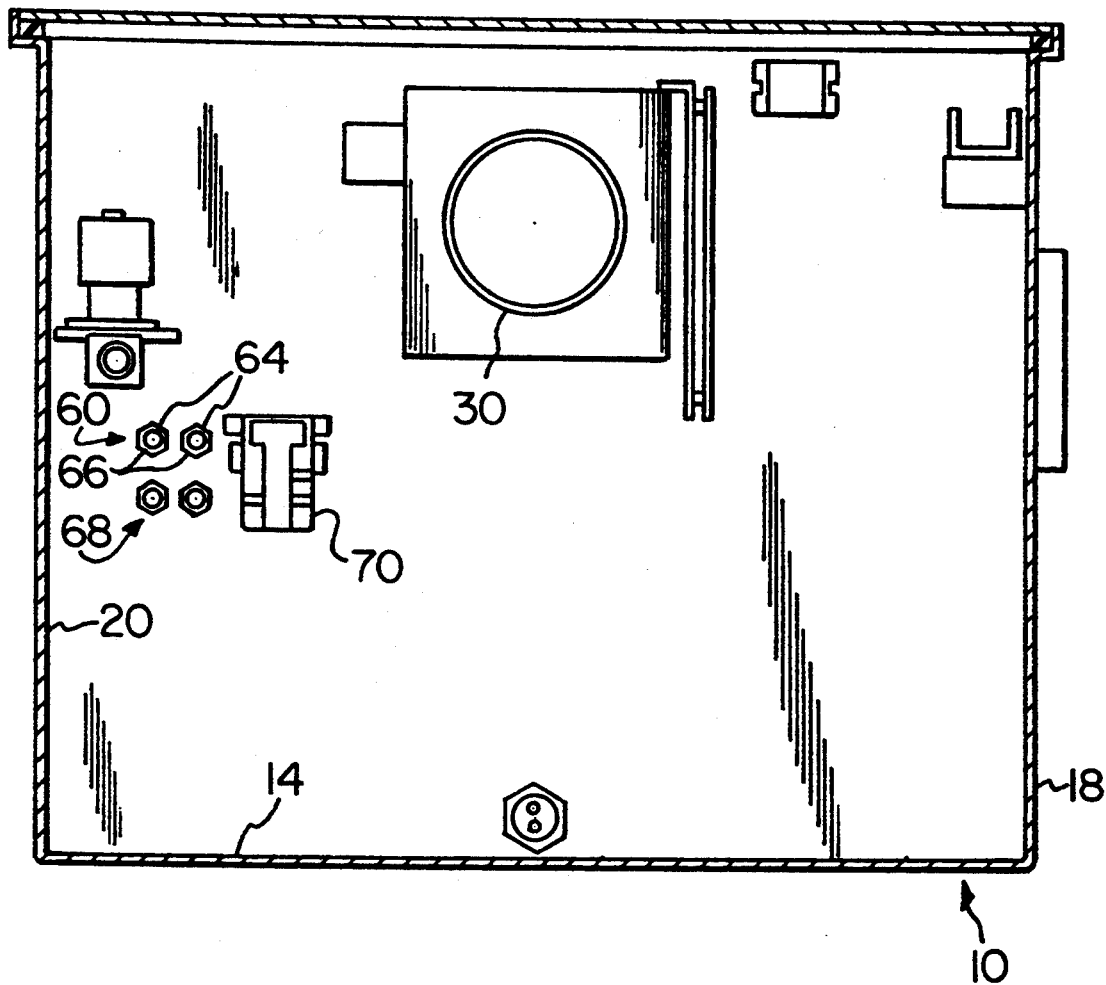
FIG. 3 is a front view of the grease interceptor of FIG. 1.

A first grease level sensor 60 (shown in FIGS. 2 and 3) is positioned on partition wall 16 to extend within the interceptor chamber 12 at a first threshold level. The first threshold level is preferably about 40% of the rated capacity of the interceptor chamber 12. The first grease level sensor 60 is electrically coupled to a central controller 62. The first grease level sensor 60 includes a pair of spaced stainless steel screws or poles 64 extending into the interceptor chamber 12 with nylon insulation bolts 66. One of the stainless steel screws has an appropriate voltage applied to it and the second screw is spaced a set distance from the first so that an appropriate voltage difference between the two can be measured.

A second grease level sensor 68 is positioned at a second grease level threshold value for the interceptor chamber 12. The second grease level sensor 68 is substantially identical to the first grease level sensor 60 except for the positioning within the interceptor chamber 12 and is also connected to the central controller 62.

The second grease level sensor 68 is preferably 80% of the rated capacity of the interceptor chamber 12.

A temperature sensor 70 is attached to the partition wall 16 of the interceptor chamber 12. The temperature sensor 70 is electrically connected to the central controller 62 and may be formed as an adjustable thermostat such as, for example, a thermodisc by White-Rodgers, Model No. 756-50. The thermostat can be set at approximately 115°-120° F.

The temperature sensor 70 will serve to activate a heating element 72 which is attached to the partition wall 16 and includes a heating coil 74 extending into the interceptor chamber 12. The heating element 72 is electrically coupled to the central controller 62.

A first valve assembly 76 (shown in FIG. 2) is positioned within the inlet opening 30. The first valve assembly 76 is operated by an actuator 78 which is electrically coupled to the central controller 62. Operation of the first valve assembly 76 will seal off the inlet opening 30 and discontinue the flow of liquid into the interceptor chamber 12.

An automatic grease draw-off mechanism 80 is coupled to the interceptor chamber 12. The automatic grease draw-off mechanism 80 includes a conduit 82 extending between the interceptor chamber 12 through partition wall 16 to an external grease reservoir 84. A second valve assembly 86 is positioned within the conduit 82 and is operated by a second actuator 88 coupled to the central controller 62. The second valve assembly 86 is operated to open and close the conduit 82 to thereby operate the automatic grease draw-off mechanism 80.

The grease reservoir 84 is removably positioned within a base container 90 and includes a grease reservoir capacity sensor 92 coupled thereto. The grease reservoir capacity sensor 92 is electrically connected to the central controller 62 and is adapted to indicate when the grease reservoir 84 has reached a predetermined capacity so that it can be removed from the base container 90 and replaced or emptied and returned. The grease reservoir capacity sensor 92 can be a load sensor, a float valve type sensor, a level sensor extending into the reservoir 84 or the like.

The central controller 62, the first and second actuators 78 and 88, the temperature sensor 70 and other electrical components are protected in an electrical compartment 94. Access to the interior of the electrical compartment 94 is provided through electrical compartment top 96. The electrical compartment top 96 is secured by bolts (not shown) and forms an airtight and watertight seal through use of sealing gasket 98. Additionally provided within the interior of the electrical compartment 94 is a transformer 100 for stepping down the input voltage for the device to the twenty-four volts required for the central controller 62. Furthermore, the actuators 78 and 88 are preferably solenoid actuators for actuating the first valve assembly 76 and the second valve assembly 86, respectively.

An indicator panel 104 is attached to the exterior surface of the electrical compartment 94 and electrically connected to the central controller 62. Alternatively, the indicator panel 104 may be remotely mounted in an appropriately visible location. The indicator panel 104 includes a red, amber and green lamp, each of which is independently operated and combine together to form a visually apparent indication of the current status of the grease interceptor, as will be described hereinafter. An audible alarm (not shown) may also be incorporated into the indicator panel 104.

The operation of the grease interceptor 10 of the present invention can most easily be described in connection with the operational flow chart illustrated in FIGS. 4A and 4B. Under normal operation, the grease interceptor 10 will contain a static water level immediately below the entrance height of the inlet opening 30 and the outlet opening 34. Liquid flowing into the interceptor chamber 12 will displace an equal volume of separated wastewater from the outlet chamber 32 through the outlet opening 34. Liquid will flow through the inlet opening 30 and be directed downwards by the baffle plate 42. This minimizes the turbulence or the disturbance of the liquid within the interceptor chamber which is separating into grease and wastewater. The liquid will eventually flow beneath the baffle plate 42 to position underneath the bottom plate 44. The perforations 46 will allow the liquid to flow into the interceptor chamber 12 wherein gravity will cause the separation of the grease, fats and oils from the remaining wastewater. The grease will float to the top of the interceptor while the wastewater will tend to stay at the bottom. The interceptor plate 48 will keep the combination of grease and wastewater from flowing directly across the bottom of the interceptor chamber 12 below the bottom plate 44 into the outlet chamber 32. Due to the separation within the interceptor chamber 12, only wastewater which is substantially free of grease will flow into the outlet chamber 32 and subsequently out of the outlet opening 34.

It will be appreciated that with continued operation of the grease interceptor 10 grease will begin to build up within the interior of the interceptor chamber 12 from the top down toward the bottom of the interceptor chamber 12. Upon powering up of the grease interceptor 10, the central controller 62 will proceed through a self-diagnostic test and, if everything is satisfactory, the green lamp on the indicator panel 104 will be activated to indicate the normal operation of the grease interceptor 10. The flow will begin through the inlet opening 30 as described above. As flow begins, the central controller 62 monitors the first grease level sensor 60 to determine whether the grease has accumulated within the interceptor chamber 12 to the first threshold level. The first grease level sensor 60 is indicated as sensor No. 1 in the diagram of FIGS. 4A and 4B. As indicated in FIG. 4A, the circuit will continue to monitor the first grease level sensor 60 until it indicates that the grease level has extended down to or beyond the first threshold level. Grease and wastewater have very different conductive and insulative properties whereby a significant change in the measured voltage difference between the pair of screws 64 will indicate the presence of the grease.

Upon receiving an indication from the first grease level sensor 60 that the grease within the interceptor chamber has reached a first threshold level, preferably 40% of the rated capacity of the interceptor chamber 12, central controller 62 will then activate the amber lamp on the indicator panel 104 to indicate to the user that the grease interceptor 10 has entered into a grease removal cycle.

During the beginning of the grease removal cycle, the central controller will monitor the temperature sensor 70 (sensor No. 3 in FIG. 4B) to determine whether the temperature within the interceptor chamber 12 indicated by the temperature sensor 70 is above a preset temperature value, preferably 115°-120° F. If not, the central controller 62 will activate the heating element 72 to appropriately raise the temperature of the wastewater and grease within the interceptor chamber 12 until the temperature sensor 70 indicates a value above the preset value. This heating of the wastewater and grease within the interceptor chamber during the grease removal cycle will assure that the grease is liquefied during the grease removal cycle.

Upon reaching a temperature above the predetermined temperature, the heating element 72 is turned off. The central controller 62 again monitors the first grease level sensor 60 to determine whether the grease level remains at or beyond the first predetermined threshold level. If it does not, the process is returned to the original condition prior to the activation of the grease removal cycle. If the first grease level sensor 60 continues to indicate the presence of grease, the central controller 62 activates actuator 88 to open the second valve assembly 86 which is maintained open for a specific time period by a preset time delay. This allows the top layers of grease to be drawn off to the grease reservoir 84.

The first grease level sensor 60 is monitored after the heating step as a precaution because an inflow of water may raise the grease level to a point which would not activate the first grease level sensor 60 or the heating step may liquefy a localized piece of solid grease and redistribute it over the entire interceptor chamber 12 effectively raising the grease level. Opening the second valve assembly under these conditions would draw off water which would devalue the resulting reclaimed grease.

During the time delay for which the second valve assembly 86 is opened, the central controller 62 performs a parallel process which continually monitors the first grease level sensor 60. If during the time delay the first grease level sensor 60 indicates that there is no longer sufficient grease to activate the sensor, the time delay is interrupted and the grease removal cycle ended. Following the end of the grease removal cycle, the amber lamp of the indicator panel 104 is deactivated and the system returned to the normal operating condition.

Figure 4A:
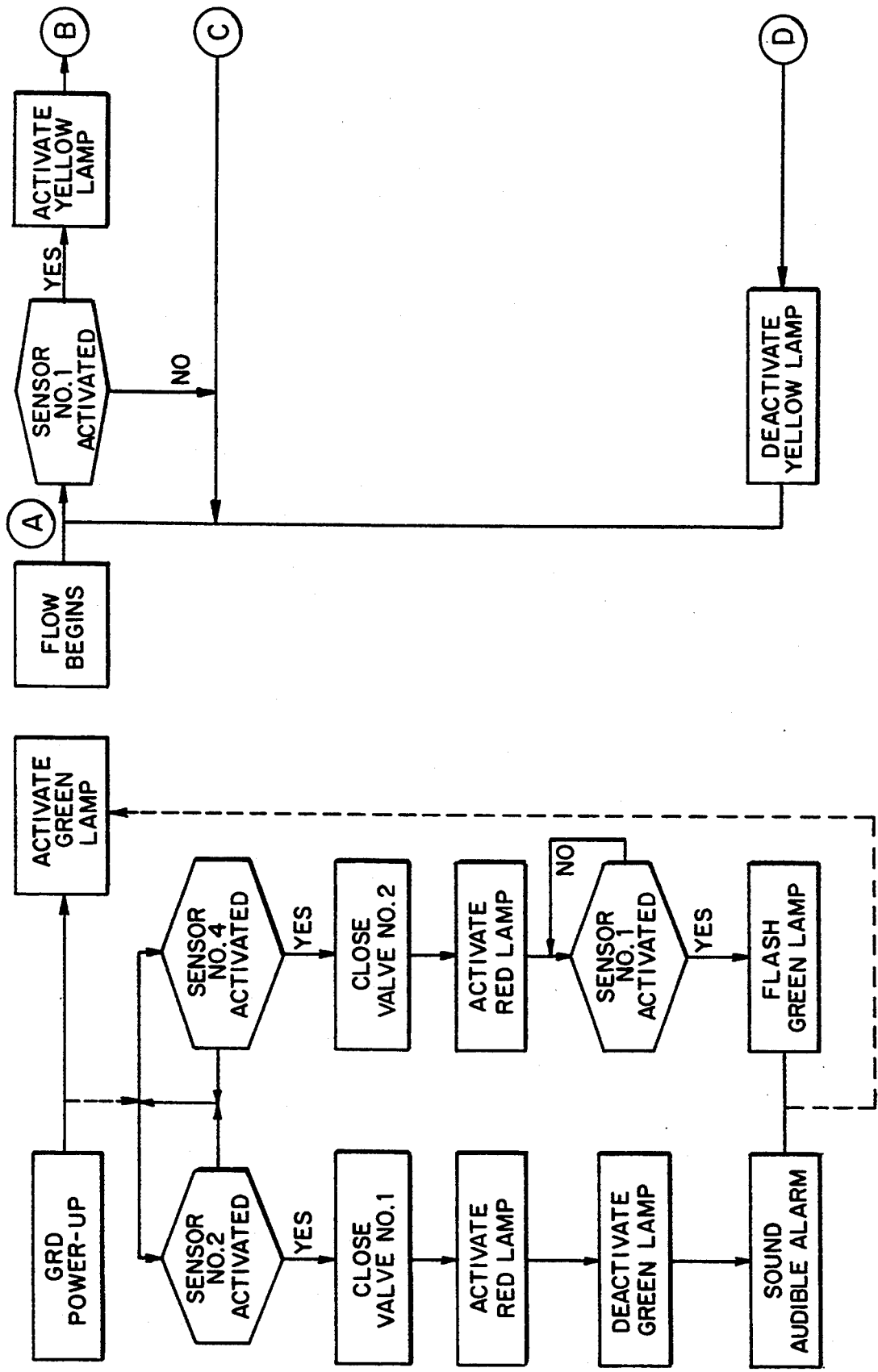
FIGS. 4A and 4B are an operational flow chart of the operation of a grease interceptor according to the present invention.
Figure 4B:
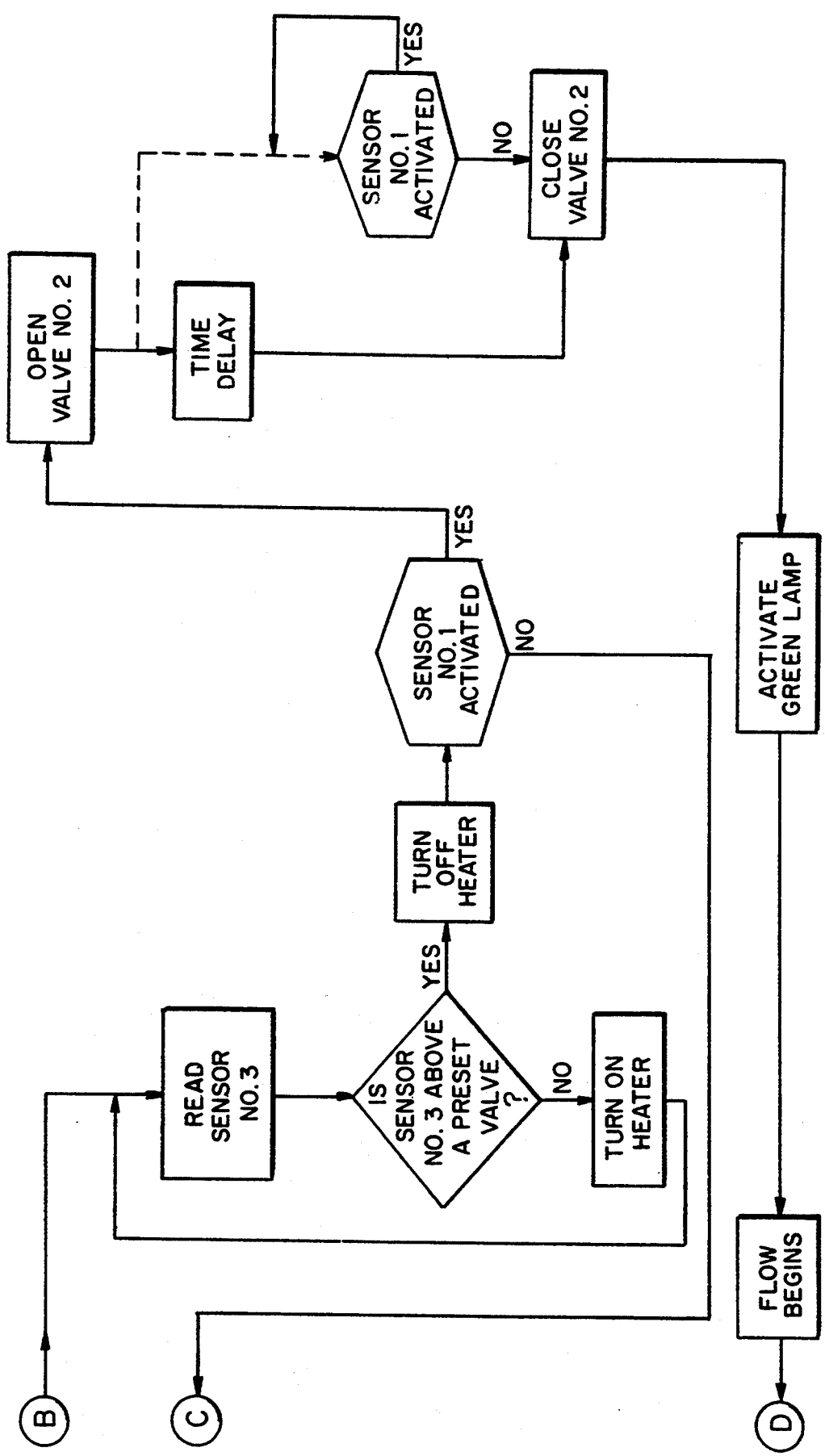

As indicated in FIG. 4A, two parallel processes are continuously monitored throughout the entire procedure. The first is an indication by the second level sensor 68 (indicated as sensor No. 2 in FIG. 4A) that the grease level in the interceptor chamber 12 is beyond a second threshold amount, preferably about 80% of the rated capacity of the interceptor chamber 12. As noted above, the grease in the interceptor chamber 12 will build from the top down so that the second grease level sensor 68 is positioned below the first grease level sensor 60. The activation of the second grease level sensor 68 indicates a malfunction in the automatic removal operation of the grease from the interceptor chamber 12. The central controller 62 will immediately activate the first actuator 78 to close the first valve assembly 76 halting the flow of wastewater and grease into the grease interceptor 10. The central controller 62 will activate the red lamp on the indicator panel 104 and sound the audible alarm to indicate the need for operator attention.

A second parallel process continuing throughout is the monitoring of the grease reservoir capacity sensor 92 (sensor No. 4 in FIG. 4A) to determine when the grease reservoir is full. Upon receiving an indication that the grease reservoir is full of grease past a predetermined threshold value, the central controller 62 will activate the red lamp on the indicator panel 104 and begin to monitor the first grease level sensor 60 to determine when grease within the interceptor chamber 12 is past the first threshold amount. Should the first grease level sensor 60 indicate a level of grease within the interceptor chamber 12 above the first threshold amount after the reservoir 84 is full, the central controller 62 will flash the green lamp on the indicator panel along with the red lamp.

Both of the parallel processes require a resetting of the grease interceptor 10 prior to returning to normal operation. For example, a reservoir full indication can be reset by removing the reservoir 84 and emptying it and then returning the reservoir 84 into position. After the grease reservoir capacity sensor 92 has indicated a full reservoir 84, a change in the output of the sensor will activate a time delay before returning to normal operation. This time delay will allow the user time to empty the reservoir before normal operation commences. This additional time delay may be indicated by appropriate lamps on the indicator panel 104.

While the foregoing describes the present invention with particularity, it will be readily apparent to those of ordinary skill in the art that modifications are possible without departing from the spirit and scope of the present invention. Accordingly, and in accordance with the patent laws, the scope of the present invention is intended as described in the following claims.

What is claimed is:

1. An automatic grease interceptor operable for separating grease, fats and oils from a wastewater mixture, said grease interceptor comprising:
   an interceptor chamber;
   an inlet opening connected to said interceptor chamber;
   a baffle means positioned within said interceptor chamber and adapted to minimize turbulence from a wastewater mixture being introduced into said interceptor chamber, said baffle means including a solid baffle plate positioned adjacent said inlet opening, a perforated bottom plate attached to a lower end of said baffle plate, and a solid interceptor plate attached to an underside of said perforated bottom plate;
   a first outlet means connected to said interceptor chamber;
   a double wall trap positioned between an upper end of said outlet means and said interceptor chamber;
   a grease removal means for removing grease from said interceptor chamber through a second outlet means; and
   a first grease level sensor positioned within said interceptor chamber at a first threshold level and coupled to said grease removal means through a central controller, wherein an indication of grease at said first threshold level by said first grease level sensor will activate said grease removal means for removing grease from said interceptor chamber for a grease removal cycle.

2. The interceptor of claim 1 further including:
   a first valve means positioned within said inlet opening and coupled to said central controller; and
   a second grease level sensor positioned within said interceptor chamber at a second threshold level and coupled to said central controller, wherein an indication of grease at said second threshold level will close said first valve means prohibiting further inflow of liquid into said interceptor chamber.

3. The interceptor of claim 2 further including:
an alarm means coupled to said central controller to indicate a need for operator attention, wherein said alarm means will activate when said first valve means is closed.

4. An automatic grease interceptor operable for separating grease, fats and oils from a wastewater mixture, said grease interceptor comprising:
an interceptor chamber;
an inlet opening connected to said interceptor chamber;
a baffle means positioned within said interceptor chamber and adapted to minimize turbulence from a wastewater mixture being introduced into said interceptor chamber, said baffle means including a solid baffle plate positioned adjacent said inlet opening, a perforated bottom plate attached to a lower end of said baffle plate, and a solid interceptor plate attached to an underside of said perforated bottom plate;
an outlet means connected to said interceptor chamber;
a double wall trap positioned between an upper end of said outlet means and said interceptor chamber;
a grease removal means for removing grease from said interceptor chamber through a second outlet means;
a first grease level sensor positioned within said interceptor chamber at a first threshold level and coupled to said grease removal means through a central controller, wherein an indication of grease at said first threshold level by said first grease level sensor will activate said grease removal means for removing grease from said interceptor chamber for a grease removal cycle;
a temperature sensor coupled to said interceptor chamber and to said central controller; and
a heater means positioned within said interceptor chamber and coupled to said central controller, wherein an indication of said temperature sensor of a temperature below a predetermined temperature threshold value during said grease removal cycle will activate said heater means until said temperature sensor indicates a temperature above said temperature threshold value.

5. An automatic grease interceptor operable for separating grease, fats and oils from a wastewater mixture, said grease interceptor comprising:
an interceptor chamber;
an inlet opening connected to said interceptor chamber;
a baffle means positioned within said interceptor chamber and adapted to minimize turbulence from a wastewater mixture being introduced into said interceptor chamber, said baffle means including a solid baffle plate positioned adjacent said inlet opening, a perforated bottom plate attached to a lower end of said baffle plate, and a solid interceptor plate attached to an underside of said perforated bottom plate;
an outlet means connected to said interceptor chamber;
a double wall trap positioned between an upper end of said outlet means and said interceptor chamber;
a grease removal means for removing grease from said interceptor chamber through a second outlet means;
a first grease level sensor positioned within said interceptor chamber at a first threshold level and coupled to said grease removal means through a central controller, wherein an indication of grease at said first threshold level by said first grease level sensor will activate said grease removal means for removing grease from said interceptor chamber for a grease removal cycle;
a grease reservoir adapted to receive grease from said grease removal means; and
a grease reservoir capacity sensor attached to said grease reservoir and coupled to said central controller wherein said grease reservoir capacity sensor is adapted to indicate when said grease reservoir is filled to a predetermined capacity.

6. The interceptor of claim 5 further including:
a temperature sensor coupled to said interceptor chamber and to said central controller; and
a heater means positioned within said interceptor chamber and coupled to said central controller, wherein an indication of said temperature sensor of a temperature below a predetermined temperature threshold value during said grease removal cycle will activate said heater means until said temperature sensor indicates a temperature above said temperature threshold value.

7. The interceptor of claim 5 further including:
a first valve means positioned within said inlet opening and coupled to said central controller; and
a second grease level sensor positioned within said interceptor chamber at a second threshold level and coupled to said central controller, wherein an indication of grease at said second threshold level will close said first valve means prohibiting further inflow of liquid into said interceptor chamber.

8. The interceptor of claim 7 wherein said grease removal means include a conduit extending between said grease reservoir and said interceptor chamber and a second valve means positioned within said conduit and coupled to said central controller, wherein said grease removal means is operated by opening said second valve means.

9. The interceptor of claim 8 wherein said first and second grease level sensors include a pair of spaced poles, one of which has a specified voltage applied thereto, wherein each said grease level sensor measures the voltage between said pair of spaced poles.

10. The interceptor of claim 8 further including:
an electrical compartment adjacent said interceptor chamber, said electrical compartment housing said central controller, said temperature sensor and actuators for said first valve means and said second valve means.

11. The interceptor of claim 10 further including:
an indicator panel attached to an exterior surface of said electrical compartment and coupled to said central controller, said indicator panel adapted to visually indicate the current status of operation of said grease interceptor.

12. The interceptor of claim 8 wherein said outlet means include an outlet chamber with an outlet opening therein and a cleanout plug positioned in a top surface of said outlet chamber.

13. The interceptor of claim 12 wherein said inlet opening and said outlet opening are formed as no hub connections.

14. An automatic grease interceptor operable for separating grease, fats and oils from a wastewater mixture, said grease interceptor comprising:
an interceptor chamber;
an inlet opening connected to said interceptor chamber;
a baffle means positioned within said interceptor chamber and adapted to minimize turbulence from a wastewater mixture being introduced into said interceptor chamber, said baffle means including a solid baffle plate positioned adjacent said inlet opening, a perforated bottom plate attached to a lower end of said baffle plate and a solid interceptor plate attached to an underside of said perforated bottom plate;
an outlet means connected to said interceptor chamber;
a double wall trap positioned between an upper end of said outlet means and said interceptor chamber;
a grease reservoir adapted to receive grease from said interceptor chamber;
a grease removal means for removing grease from said interceptor chamber, wherein said grease removal means includes a conduit extending between said grease reservoir and said interceptor chamber and a second valve means positioned within said conduit and coupled to a central controller, wherein said grease removal means is operated by opening said second valve means;
a first grease level sensor positioned within said interceptor chamber at a first threshold level and coupled to said grease removal means through said central controller, wherein an indication of grease at said first threshold level by said first grease level sensor will activate said grease removal means for removing grease from said interceptor chamber for a grease removal cycle;
a grease reservoir capacity sensor attached to said grease reservoir and coupled to said central controller wherein said grease reservoir capacity sensor is adapted to indicate when said grease reservoir is filled to a predetermined capacity;
a temperature sensor coupled to said interceptor chamber and to said central controller;
a heater means positioned within said interceptor chamber and coupled to said central controller, wherein an indication of said temperature sensor of a temperature below a predetermined threshold value during said grease removal cycle will activate said heater means until said temperature sensor indicates a temperature above said temperature threshold value;
a first valve means positioned within said inlet opening and coupled to said central controller; and
a second grease level sensor positioned within said interceptor chamber at a second threshold level and coupled to said central controller, wherein an indication of grease at said second threshold level will close said first valve means prohibiting further inflow of liquid into said interceptor chamber.

15. The interceptor of claim 14 wherein said baffle plate and said interceptor plate extend substantially the entire width of said interceptor chamber.

16. A grease interceptor operable for separating grease, fats and oils from a wastewater mixture, said grease interceptor comprising:
an interceptor chamber;
an inlet means connected to said interceptor chamber;
a baffle means positioned within said interceptor chamber and adapted to minimize turbulence from a wastewater mixture being introduced into said interceptor chamber;
an outlet means connected to said interceptor chamber;
a grease removal means for removing grease from said interceptor chamber;
a first grease level sensor positioned within said interceptor chamber at a first threshold level;
a heater means positioned within said interceptor chamber;
a temperature sensor coupled to said interceptor chamber;
wherein an indication of grease at said first threshold level by said first grease level sensor will activate said grease removal means for removing grease from said interceptor chamber for a grease removal cycle, and an indication of said temperature sensor of a temperature below a predetermined temperature threshold value during said grease removal cycle will activate said heater means until said temperature sensor indicates a temperature above said temperature threshold value;
a first valve means positioned within said inlet means for opening and closing said inlet means; and
a second grease level sensor positioned within said interceptor chamber at a second threshold level, wherein an indication of grease at said second threshold level by said second grease level sensor will close said first valve means prohibiting further inflow of liquid into said interceptor chamber.

17. The interceptor of claim 16 wherein said grease removal means include a conduit extending between said interceptor chamber and a grease reservoir and a second valve means positioned within said conduit, wherein said grease removal means is activated by opening said second valve means.

18. A method of separating grease, fats and oils from wastewater using a grease interceptor which includes an interceptor chamber, an inlet means connected to said interceptor chamber said inlet means including a valve means for opening and closing said inlet means, a grease removal means for removing grease from said interceptor chamber, a first grease level sensor positioned at a first threshold level within said interceptor chamber, a second grease level sensor positioned within said interceptor chamber at a second threshold level, a heater means positioned within said interceptor chamber, and a temperature sensor positioned within said interceptor chamber, said method comprising the steps of:
a) monitoring said first grease level sensor to determine when grease has accumulated within said interceptor chamber to said first threshold level;
b) activating said grease removal means for a grease removal cycle upon indication by said first grease level sensor that the level of grease within said interceptor chamber is at or above said first threshold level;
c) monitoring said temperature sensor during said grease removal cycle;
d) selectively activating said heater means based upon the indications of said first temperature sensor to maintain a temperature above a predetermined temperature threshold value;

e) monitoring said second grease level sensor to determine when grease has accumulated within said interceptor chamber to said second threshold level;

f) closing said valve means of said inlet means to prohibit further inflow of liquid into said interceptor chamber upon indicator by said second grease level sensor that the level of grease within said interceptor chamber is at or above said second threshold level; and g) repeating steps a to f.

* * * * *